United States Patent
Borland et al.

(10) Patent No.: US 9,000,954 B2
(45) Date of Patent: Apr. 7, 2015

(54) MACHINE SYSTEM HAVING LANE KEEPING FUNCTIONALITY

(71) Applicant: Caterpillar Inc., Peoria, IL (US)

(72) Inventors: Brad Kenneth Borland, Peoria, IL (US); Mathew Chacko, Dunlap, IL (US); Brian Gerard Funke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 203 days.

(21) Appl. No.: 13/855,362

(22) Filed: Apr. 2, 2013

(65) Prior Publication Data

US 2014/0292544 A1    Oct. 2, 2014

(51) Int. Cl.
*G08G 1/123*    (2006.01)
*G08G 1/00*    (2006.01)

(52) U.S. Cl.
CPC ..................... *G08G 1/207* (2013.01)

(58) Field of Classification Search
USPC ............... 340/988, 425.5, 426.19, 436, 438, 340/686.1; 701/25, 26, 27, 400, 408, 409, 701/410, 411, 50, 301
See application file for complete search history.

(56) References Cited

U.S. PATENT DOCUMENTS

| | | | |
|---|---|---|---|
| 6,107,939 A | 8/2000 | Sorden | |
| 6,681,157 B2 | 1/2004 | Kageyama | |
| 2002/0165645 A1 | 11/2002 | Kageyama | |
| 2005/0182539 A1 | 8/2005 | Maass | |
| 2005/0273264 A1 | 12/2005 | Gern et al. | |
| 2007/0222662 A1 | 9/2007 | Toennesen et al. | |
| 2008/0258884 A1 | 10/2008 | Schmitz | |
| 2012/0232779 A1* | 9/2012 | Koehrsen et al. | 701/301 |
| 2013/0141520 A1* | 6/2013 | Zhang et al. | 348/36 |

FOREIGN PATENT DOCUMENTS

WO    WO 2006/037691    4/2006

OTHER PUBLICATIONS

U.S. Appl. No. 13/438,167, filed Apr. 3, 2012.

* cited by examiner

*Primary Examiner* — Toan N Pham
(74) *Attorney, Agent, or Firm* — Finnegan, Henderson, Farabow, Garrett & Dunner, LLP

(57) ABSTRACT

A lane keeping system is disclosed for use with a mobile machine. The lane keeping system may have a locating device positioned onboard the mobile machine that is configured to generate a location signal indicative of a location of the mobile machine at a worksite. The lane keeping system may also have an alarm positioned onboard the mobile machine, and a controller in communication with the locating device and the alarm. The controller may be configured to determine locations of multiple distal points of the mobile machine based on the location signal, and to make a comparison of the locations with boundaries of at least one established lane at the worksite. The controller may also be configured to selectively activate the alarm based on the comparison when the multiple distal points straddle at least one of the boundaries of the at least one established lane.

20 Claims, 4 Drawing Sheets

MACHINE SYSTEM HAVING LANE KEEPING FUNCTIONALITY

TECHNICAL FIELD

The present disclosure is directed to a machine system and, more particularly, a machine system having lane keeping functionality.

BACKGROUND

Mobile machines such as haul trucks, motor graders, water trucks, and other large equipment are utilized at a common worksite to accomplish a variety of tasks. These machines can be large, difficult to operate, heavy, and slow to respond. Some machines can also have limited operator visibility. Accordingly, it is important to ensure that these machines are kept within particular lanes during travel so as to reduce the opportunity for collision and machine damage to occur.

One attempt to improve lane keeping of a mobile machine is described in U.S. Pat. No. 6,107,939 that issued to Sorden on Aug. 22, 2000 ("the '939 patent"). Specifically, the '939 patent describes a lane change alarm system, which tracks a differential global position of a vehicle. When the vehicle is traveling in an incorrect direction within a particular lane and/or when a transverse distance within the lane deviates from a threshold distance, a multi-level alarm sounds within the vehicle. The level of the alarm increases as an error associated with the transverse distance and/or as a change rate of the error increases. The transverse distance is ignored and the alarm is prevented from sounding when a lane change signaler is used by an operator of the vehicle. A two-way radio or cellular telephone can be used to augment the alarm, by facilitating communication between a dispatcher and the operator of the vehicle during an alarm condition.

Although the system of the '939 patent may help keep a vehicle within a particular lane, it may still be problematic. In particular, the system may not be able to detect unacceptable operator behavior that can be indicative of an impending problem. In addition, the system may not be applicable to machines and/or worksites where individual lanes are segmented and only particular segments of the lanes are authorized for use by certain vehicles. The system may also not be applicable to larger machines, wherein distal points on the machine can deviate from a designated lane while a center of the machine remains well within the designated lane.

The disclosed lane keeping system is directed to overcoming one or more of the problems set forth above and/or other problems of the prior art.

SUMMARY

One aspect of the present disclosure is directed to a lane keeping system for use with a mobile machine. The lane keeping system may include a locating device positioned onboard the mobile machine that is configured to generate a location signal indicative of a location of the mobile machine at a worksite. The lane keeping system may also include an alarm positioned onboard the mobile machine, and a controller in communication with the locating device and the alarm. The controller may be configured to determine locations of multiple distal points of the mobile machine based on the location signal, and to make a comparison of the locations with boundaries of at least one established lane at the worksite. The controller may also be configured to selectively activate the alarm based on the comparison when the multiple distal points straddle at least one of the boundaries of the at least one established lane.

A second aspect of the present disclosure is directed to another lane keeping system for use with a mobile machine. This lane keeping system may include a locating device positioned onboard the mobile machine that is configured to generate a location signal indicative of a location of the mobile machine at a worksite. The lane keeping system may also include an alarm positioned onboard the mobile machine, and a controller in communication with the locating device and the alarm. The controller may be configured to detect movement of the mobile machine across a boundary of an established lane at the worksite, and to track a frequency of the movement across the boundary. The controller may also be configured to selectively activate the alarm based on the frequency.

A third aspect of the present disclosure is directed to yet another lane keeping system for use with a mobile machine. This lane keeping system may include a locating device positioned onboard the mobile machine that is configured to generate a location signal indicative of a location of the mobile machine at a worksite. The lane keeping system may also include an alarm positioned onboard the mobile machine, and a controller in communication with the locating device and the alarm. The controller may be configured to compare the location of the mobile machine with boundaries of sequential lane segments within an established lane at the worksite, and to selectively activate the alarm when the location signal indicates that the mobile machine has crossed at least one of the boundaries into one of the sequential lane segments that is not authorized for use by the mobile machine.

DETAILED DESCRIPTION

Figure 1:
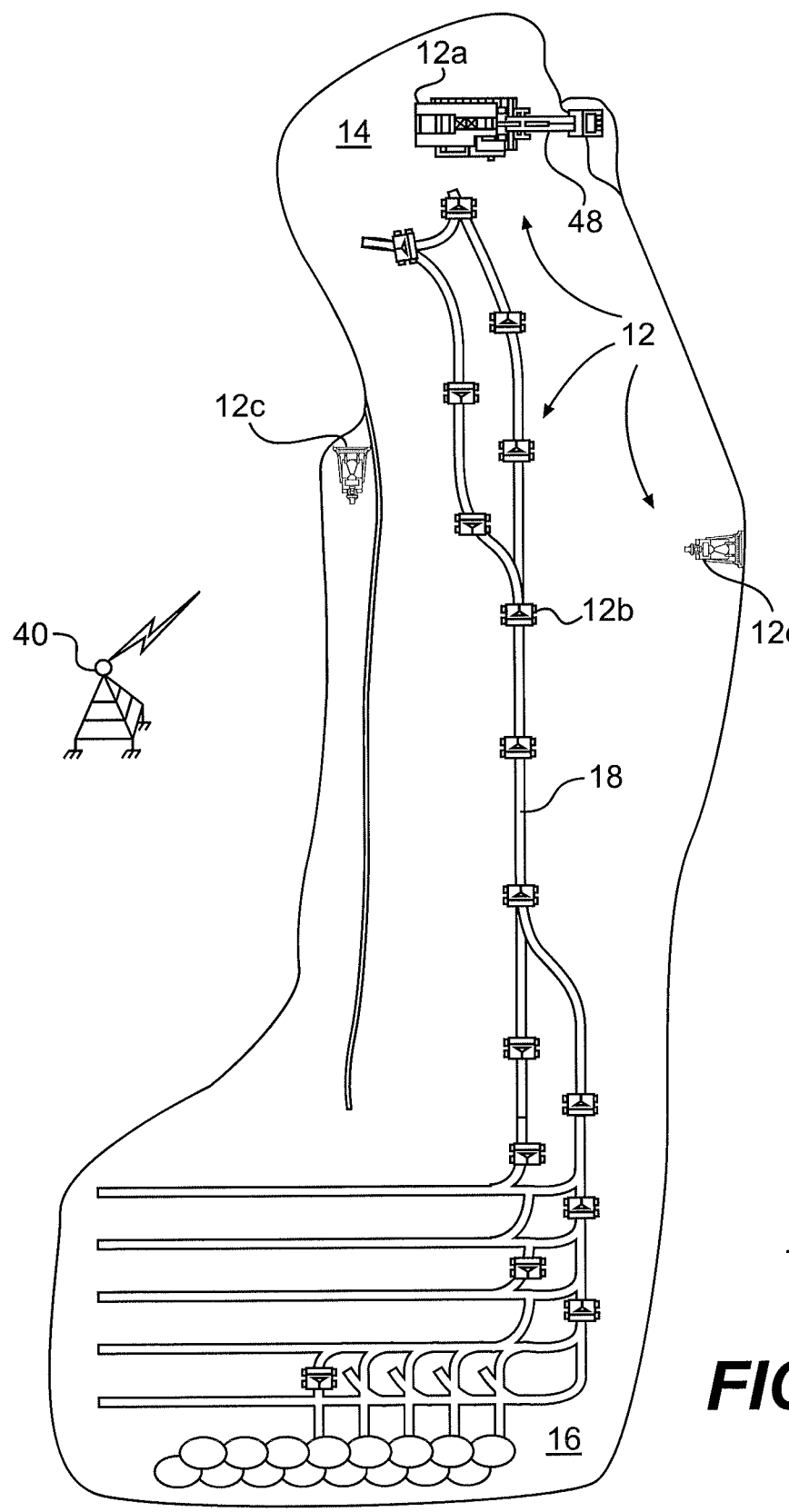
FIG. 1 is a diagrammatic illustration of an exemplary disclosed worksite.

FIG. 1 illustrates an exemplary worksite 10 with a plurality of mobile machines 12 performing different tasks at various locations of worksite 10. Worksite 10 may include, for example, a mine site, a landfill, a quarry, a construction site, a road worksite, or any other type of worksite. The tasks may be associated with any work activity appropriate at worksite 10, and may require machines 12 to generally traverse worksite 10.

Figure 2:
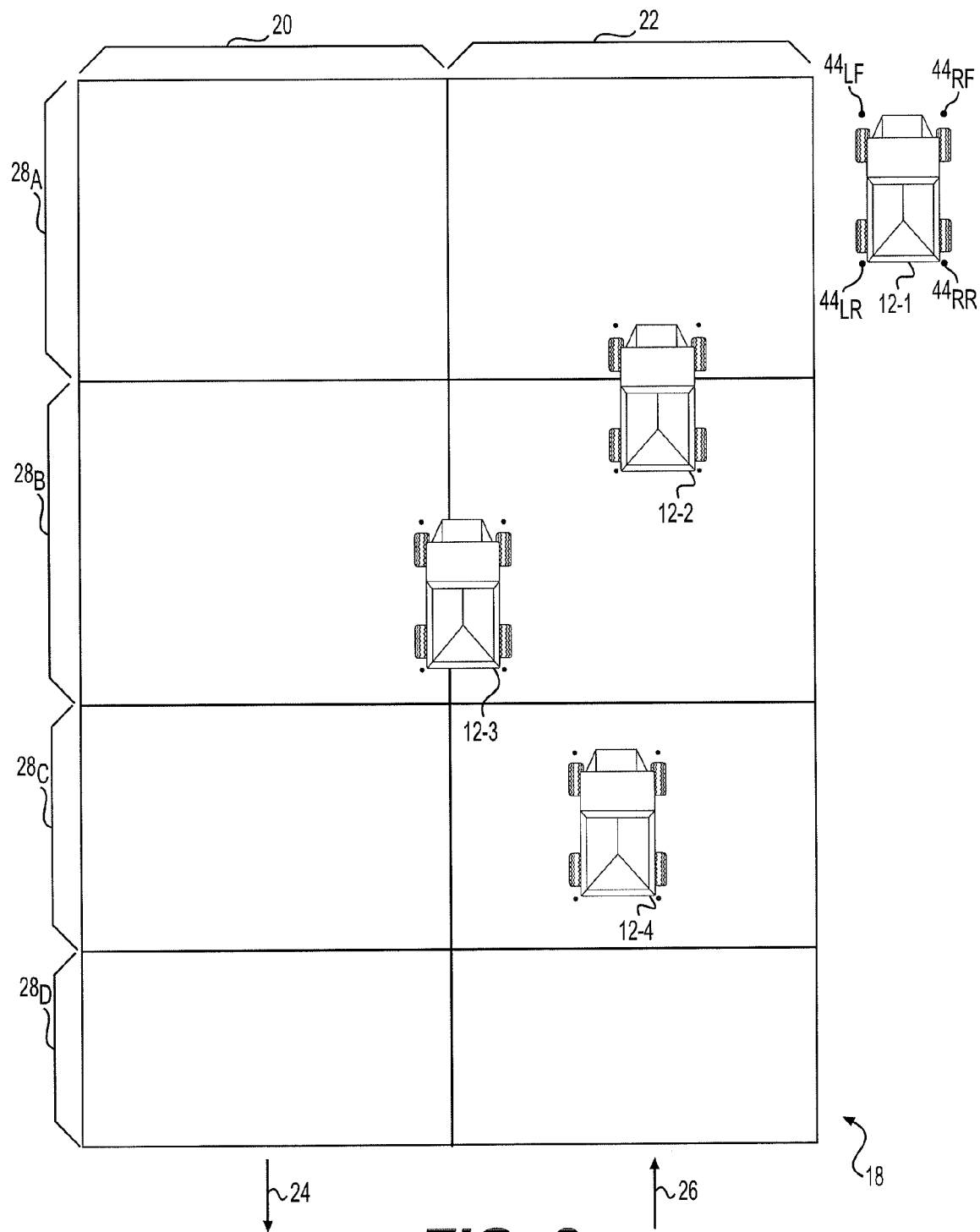
FIG. 2 is a diagrammatic illustration of an exemplary disclosed lane keeping system that may be used to manage lane keeping at the worksite of FIG. 1.

Worksite 10 may include multiple locations designated for particular purposes. For example, a first location 14 may be designated as a load location, while a second location 16 may be designated as a dump location. One or more travel paths 18 may generally extend between load location 14 and dump location 16. As shown in FIG. 2, each travel path 18 may be divided into at least two travel lanes 20, 22 having opposing travel directions (e.g., directions represented by arrows 24, 26, respectively). In addition, each of travel lanes 20, 22 may be divided into sequential lane segments 28 that are connected end-to-end. Division of travel path 18 into lanes 20, 22 and segments 28, as will be described in more detail below, may aid in regulating the movements of machines 12 at worksite 10.

Any number and types of machines 12 may simultaneously and cooperatively operate at worksite 10. For example, a first type of machine (e.g., an excavator shown in FIG. 1) 12*a* may be stationed at load location 14 and assigned to fill a second type of machine (e.g., a haul truck) 12*b* with material. A third type of machine (e.g., a dozer, a motor grader, a water truck, and/or a service vehicle) 12*c* may be tasked with traveling up and down travel path 18 to condition travel path 18, to clean up load and/or dump locations 14, 16, and/or to service other machines 12 at any location of worksite 10. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator.

Each of the different types of machines 12*a*-12*c* (and other types) may move about worksite 10 completing their assigned tasks at different speeds. For example, an excavator or dozer may travel relatively slowly, while a haul truck or water truck may travel somewhat faster. A service truck may travel even faster than a haul truck. When a faster machine 12 follows a slower machine 12, the faster machine 12 may suffer productivity and/or efficiency losses. Accordingly, there may be a periodic need for the faster machine 12 to overtake the slower machine 12.

Figure 3:
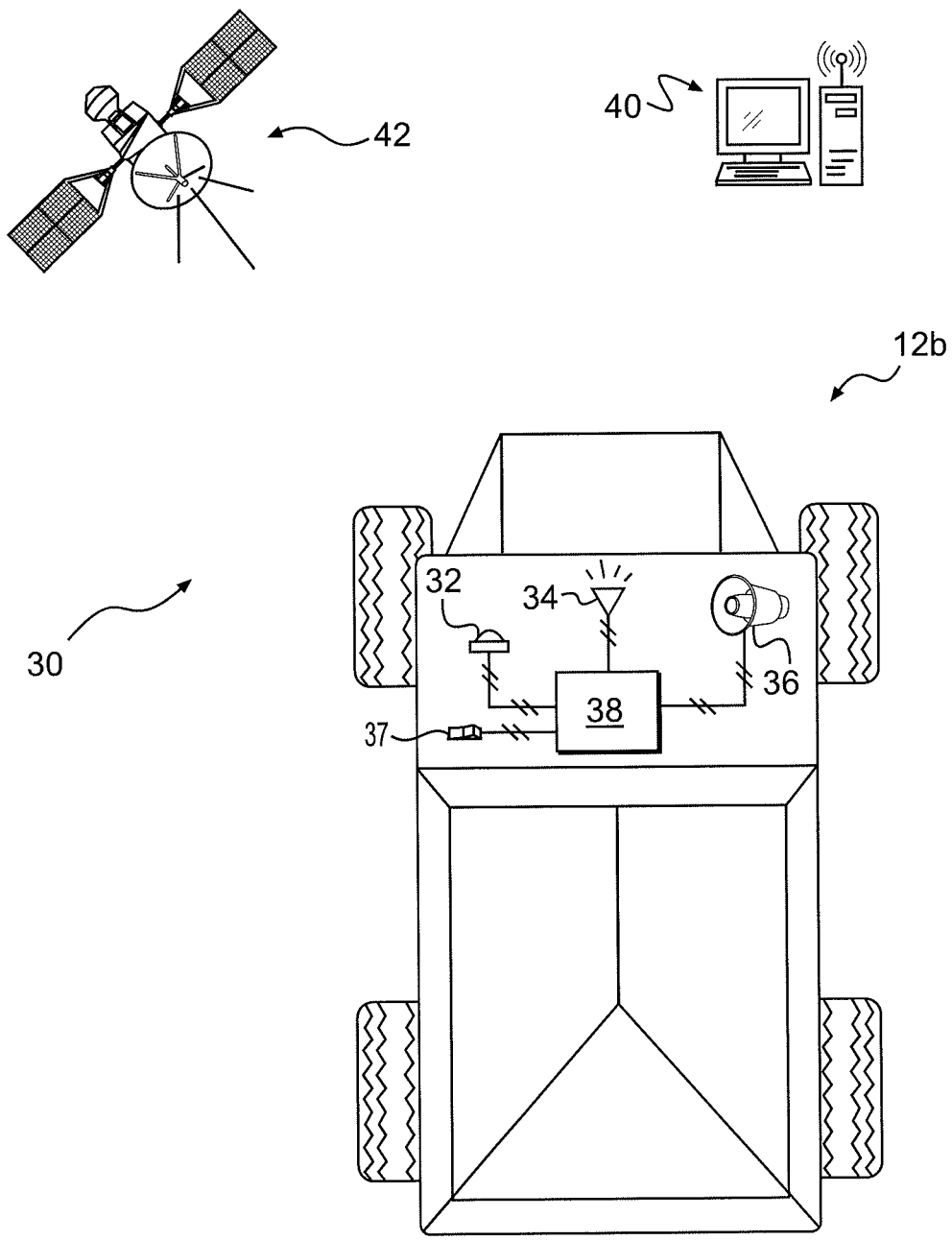
FIG. 3 is a virtual representation of a portion of the worksite of FIG. 1.

As shown in FIG. 3, each machine 12 (a haul truck is shown by way of example only) may be equipped with components of a lane keeping system 30 that facilitate lane keeping of machine 12. Lane keeping system 30 may include, among other things, a locating device 32, a communication device 34, an alarm 36, an input device 37, and an onboard controller 38 in communication with each of locating device 32, communication device 34, alarm 36, and input device 37. Lane keeping system 30 may additionally include an offboard or worksite controller 40 in communication with each onboard controller 38 via corresponding communication devices 34.

As each machine 12 travels about worksite 10, a Global Navigation Satellite System (GNSS) or other tracking device or system 42 may communicate with locating device 32 to monitor the movements of machine 12 and generate corresponding location signals. The location signals may be directed to onboard controller 38 for comparison with an electronic map of worksite 10 and for further processing. The further processing may include, among other things, determining a current location of each machine 12; a distance between machines 12; boundaries of lanes 20, 22 and segments 28; speeds of machines 12; and/or projected travel paths of machines 12.

Communication device 34 may facilitate communication between onboard controllers 38 and/or between onboard controllers 38 and worksite controller 40. This communication may include, for example, the coordinates, speeds, and/or projected travel paths of machines 12 generated based on signals from locating device 32. The communication may also include notification of lane and/or segment boundaries, and/or identification of particular lanes 20, 22 and segments 28 that have been authorized for use by certain machines 12. Data messages associated with lane keeping system 30 may be sent and received via a wireless communication link. The wireless communications may include satellite, cellular, infrared, and any other type of wireless communications that enable communicating device 34 to exchange information between worksite controller 40 and onboard controllers 38.

Alarm 36 may be located within an operator cabin of machine 12, and be configured to alert the operator of machine 12 regarding an undesirable condition. Alarm 36 may take any form known in the art and provide an audible alert, a visual alert, a tactile alert, or any combination of these alerts. Alarm 36 may be selectively activated and deactivated by controller 38 and, in some instances, selectively silenced by the operator of machine 12. The undesirable conditions, as will be described in more detail below, may be associated with portions or all of machine 12 crossing boundaries into areas not authorized for use by machine 12.

Input device 37 may be used by the operator of machine 12 to initiate an overtaking event (i.e., to initiate an event where a trailing machine 12 passes a leading machine 12). In one example, input device 37 is a button or a switch that, when pushed by the operator, generates an overtaking signal directed to controller 38 indicative of a desire to overtake another machine 12. In another embodiment, input device 37 is a lever that when pulled or tilted, activates a turn signal of machine 12. It is contemplated, however, that any other type of input device known in the art may be utilized to selectively initiate and/or indicate a desire to initiate an overtaking event. Overtaking signals generated by input device 37 may be directed to controller 38 for further processing.

Controller 38 may embody a single microprocessor or multiple microprocessors that include a means for monitoring, processing, recording, indexing, and/or communicating the location and/or overtaking signal, and for selectively and responsively activating alarm 36. For example, controller 38 may include a storage device, a clock, and a processor, such as a central processing unit or any other means for accomplishing a task consistent with the present disclosure. Numerous commercially available microprocessors can be configured to perform the functions of controller 38. It should be appreciated that controller 38 could readily embody a general machine controller capable of controlling numerous other machine functions. Various other known circuits may be associated with controller 38, including signal-conditioning circuitry, communication circuitry, and other appropriate circuitry.

Worksite controller 40 may include any means for monitoring, recording, storing, indexing, processing, and/or communicating various operational aspects of worksite 10 and machines 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 4:
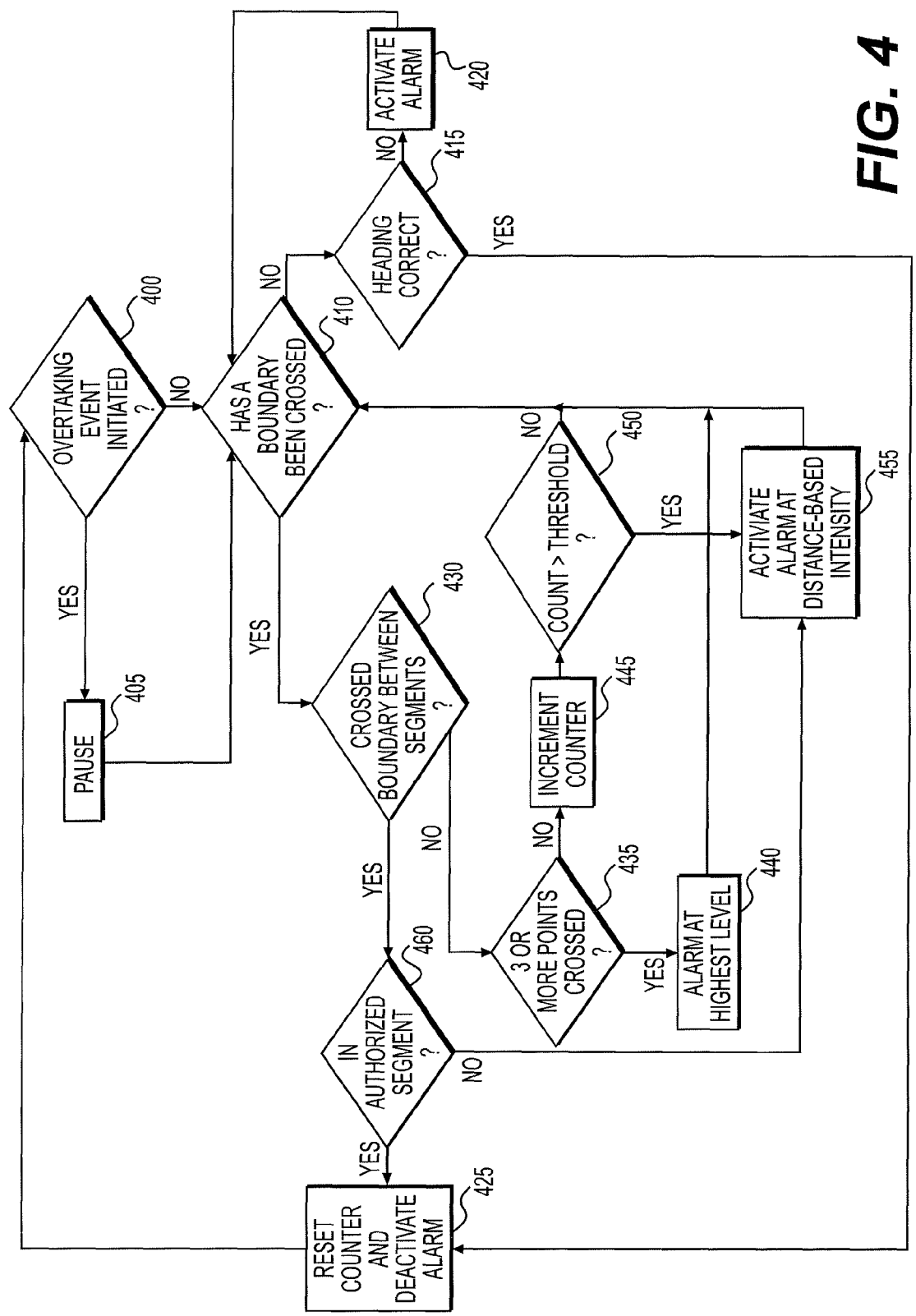
FIG. 4 is a flowchart depicting an exemplary disclosed lane keeping control method that may be implemented by the lane keeping system of FIG. 2.

Lane keeping system 30 may be configured to execute instructions stored on computer readable medium to perform methods of lane keeping control at worksite 10. FIG. 4 illustrates one example of these methods. FIG. 4 will be described in more detail below to further illustrate the disclosed concepts.

Industrial Applicability

The disclosed lane keeping system finds potential application at any worksite having multiple simultaneously operating machines. The disclosed system finds particular application at worksites having large, cumbersome, manned machines traveling in adjacent lanes with oncoming traffic. The disclosed system may provide lane keeping functionality that can help to reduce a likelihood of collision between the machines. Operation of lane keeping system 30 will now be described in detail with reference to FIG. 4.

As shown in FIG. 4, operation of lane keeping system 30 may begin with controller 38 determining if an overtaking event has been initiated (Step 400) by the operator of a host machine 12 (i.e., by the operator of the machine 12 in which the particular controller 38 is mounted). As described above, an overtaking event may be initiated through use of input device 37. Specifically, the operator of the host machine 12 may manipulate input device 37 to generate an overtaking signal indicative of a desire to overtake another machine 12 traveling in front of the host machine 12. This signal may be directed to controller 38, thereby initiating (or signaling the desire to initiate) the overtaking event. Upon receipt of the overtaking signal, controller 38 may consider the overtaking event to have been initiated. It is contemplated that other ways of determining initiation of the overtaking event may alternatively be utilized, if desired.

When controller 38 determines that an overtaking event has been initiated, controller 38 may pause for a period of time (Step 405). This pause may allow the overtaking event to be completed, before control over lane keeping is instituted. That is, controller 38 may inhibit use of alarm 36 during an overtaking event so as to reduce distraction or annoyance of the machine operator. During this time, the operator should already be aware that boundaries between lanes 20, 22 are being crossed and not need to be alerted of the fact. In the disclosed embodiment, this pause may endure for about 120 seconds, although other time durations can also be used.

After controller 38 has paused for the prescribed amount of time or when controller 38 determines at step 400 that an overtaking event has not been initiated, controller 38 may determine if any lane boundaries have been crossed by the host machine 12 (Step 410). As shown in FIG. 2, these boundaries may include the longitudinal boundary between lanes 20, 22, or the outer boundaries of lanes 20, 22. These boundaries may also or alternatively include the boundaries between different lane segments 28 (e.g., between segments $28_A$, $28_B$, $28_C$, and/or $28_D$).

Controller 38 may determine that a particular boundary has been crossed by comparing a location of the host machine 12, as provided by the location signal from locating device 32, with an electronic map of worksite 10. In the disclosed embodiment, the location signal corresponds with a particular point of machine 12 (e.g., a central point at location device 32), and controller 38 may calculate the positions of multiple distal points 44 (e.g., $44_{LF}$, $44_{RF}$, $44_{LR}$, and $44_{RR}$) of the host machine 12 based on the location signal. Controller 38 may then compare the positions of all distal points 44 with the boundaries of lanes 20, 22 and/or segments 28 in step 410. Distal points 44, in the disclosed embodiment, correspond with the four outermost corners (e.g., the left-front corner, right-front corner, left-rear corner, and right-rear corner) of the host machine 12, although other distal points (e.g., the locations of tires, the locations of work tools, the locations of bumpers, the location of fenders, etc.) may alternatively be utilized. It is also contemplated that distal points 44 may alternatively be positions located offboard machine 12 and spaced a predetermined distance away from particular components, if desired.

FIG. 2 shows four different exemplary scenarios that are considered by controller 38 during completion of step 410. In a first of the exemplary scenarios, a particular host machine 12-1 has left travel path 18 completely. That is, machine 12-1 may have been traveling within lane 22, and all distal points 44 of machine 12-1 have crossed the outermost boundary of lane 22 and entered into a non-travel path area of worksite 10. In a second of the exemplary scenarios, only distal points $44_{LF}$ and $44_{RF}$ of a particular host machine 12-2 have crossed a boundary between lane segments $28_A$ and $28_B$, within lane 22. In other words, machine 12-2 is straddling the boundary, and distal points $44_{LR}$ and $44_{RR}$ are located on an opposing side of the same boundary. A third of the exemplary scenarios, involving a particular host machine 12-3, is similar to the second exemplary scenario, in that machine 12-3 is straddling the longitudinal boundary between lanes 20, 22. A fourth of the exemplary scenarios is associated with all distal points 44 being within a single segment 28 of a single lane 20 or 22.

When controller 38, during completion of step 410, determines that machine 12 has not crossed any boundary (corresponding to the fourth scenario of host machine 12-4), controller 38 may then check to see if the current heading of the host machine 12 is correct (Step 415). In particular, controller 38 may compare the current heading of the host machine 12 (determined based on a change in machine position provided by locating device 32 over a period of time) with a heading previously designated for the lane 20, 22 in which the host machine 12 is currently located. When controller 38 determines that the heading of the host machine 12 contradicts the heading designated for the particular lane 20, 22, controller 38 may responsively activate alarm 36. In the disclosed embodiment, alarm 36 may be activated at the highest level in this situation, and worksite controller 40 may be alerted of the condition via communication device 34. By alerting worksite controller 40 of the condition, a dispatcher at worksite 10 may have the opportunity to contact the operator of the host machine 12 and determine the cause of the heading error and/or to provide evasive instructions to correct the error.

In the fourth scenario depicted in FIG. 2, the host machine 12-4 is traveling in the heading designated for lane 22. In this situation, following completion of step 415, controller 38 may deactivate alarm 36 (if previously activated) and reset an internal counter (Step 425), which will be described in more detail below.

When, at step 410, controller 38 determines that the host machine 12 has crossed a boundary, controller 38 may then determine which boundary has been crossed. In particular, controller 38 may determine if the crossed boundary is located between segments 28 (Step 430). When it is determined that the crossed boundary is a longitudinal boundary (i.e., not a segment boundary), controller 38 may then determine if three or more distal points 44 have crossed the longitudinal boundary (like in the first scenario of host machine 12-1) or if the host machine 12 is straddling the longitudinal boundary (like in the third scenario of host machine 12-3) (Step 435). When it is determined that three or more distal points 44 have crossed the longitudinal boundary, controller 38 may conclude that either the host machine 12 is now traveling in the wrong lane into oncoming traffic or has left travel path 18 completely. In either situation, controller 38 may immediately activate alarm 36 at the highest level (Step 440). As described above, once alarm 36 has been activated at its highest level, worksite controller 40 may be notified of the condition via communication device 34. Control may return from step 440 to step 410.

When, at step 435, controller 38 determines that fewer than three distal points 44 have crossed the longitudinal boundary (i.e., that the host machine 12 is straddling the boundary), controller 38 may increment its internal counter (Step 445), and then compare the resulting count to a threshold value (Step 450). As long as the count is less than the threshold value, control may loop through steps 410-450, without activation of alarm 36. This may allow for the occasional movement of the host machine 12 across a boundary by a short distance, as long as the movement does not last for long and/or doesn't occur often. That is, long and/or frequent occurrences of boundary violation may correspond with drifting or weaving of machine 12 and be indicative of an impaired driver or malfunctioning machine 12, and the use of the counter may help to determine the duration and/or frequency of the violation.

When the duration and/or frequency of boundary crossing becomes excessive (i.e., when the count exceeds the threshold value at step 450), controller 38 may activate alarm 36 at an intensity based on a distance that machine 12 has moved past the boundary (Step 455). In particular, when the first of distal points 44 has moved a short distance past the boundary, alarm 36 may be activated at a low level. And as the same or another distal point 44 moves further past the boundary, alarm 36 may be activated at a higher level. Control may return from step 455 to step 410.

Returning to step 430, when controller 38 determines that the crossed boundary is a segment boundary, controller 38 may then be configured to determine if the segment(s) that the host machine 12 is currently in has been authorized for use by that host machine 12 (Step 460). Specifically, in some embodiments, machine 12 may be authorized to use only particular segments 28, even when machine 12 is traveling in the correct lane with the right heading. This strategy may help to control longitudinal spacing between consecutive machines 12. In the event that the host machine 12 enters a segment 28 not authorized for use by the host machine 12, controller 38 may proceed to step 455. In particular, alarm 36 may be activated at an intensity based on a distance that the host machine 12 has moved into the non-authorized segment 28. This may help to inhibit a following machine 12 from colliding with a slower or stopped leading machine 12. When, at step 460, controller 38 determines that the host machine 12 has authorization to use the segments 28 adjacent the crossed border, controller 38 may reset its counter and deactivate alarm 36 (if previously activated). That is, control may move from step 460 to step 425 already described above.

Because the disclosed system may be able to detect unacceptable operator behavior (e.g., drifting or weaving), the system may be able to intervene and help prevent a collision. Specifically, the disclosed system may be able to alert the operator of the unacceptable behavior, allowing the operator to correct the behavior. In addition, the system may alert a dispatcher of the behavior, allowing the dispatcher to diagnose the problem and/or to provide evasive instructions to avoid the collision.

In addition, the disclosed system may not only help to prevent head-on collisions, but also help to prevent rear-end collisions. That is, by monitoring the location of a machine relative to both a longitudinal boundary and the segment boundaries, the operators of machines 12 may be alerted when they enter non-authorized segments 28. This may help a trailing machine 12 to avoid collisions with a slower or stopped leading machine 12.

It will be apparent to those skilled in the art that various modifications and variations can be made to the lane keeping system of the present disclosure. Other embodiments will be apparent to those skilled in the art from consideration of the specification and practice of the lane keeping system disclosed herein. It is intended that the specification and examples be considered as exemplary only, with a true scope being indicated by the following claims and their equivalents.

What is claimed is:

1. A lane keeping system for use with a mobile machine, comprising:
    a locating device positioned onboard the mobile machine and configured to generate a location signal indicative of a location of the mobile machine at a worksite;
    an alarm positioned onboard the mobile machine; and
    a controller in communication with the locating device and the alarm, the controller being configured to:
        determine locations of multiple distal points of the mobile machine based on the location signal;
        make a comparison of the locations with boundaries of at least one established lane at the worksite; and
        selectively activate the alarm based on the comparison when the multiple distal points straddle at least one of the boundaries of the at least one established lane.

2. The lane keeping system of claim 1, wherein:
    the at least one established lane includes a first lane and a second lane adjacent each other; and
    the controller is configured to activate the alarm when at least one of the multiple distal points crosses a boundary between the first and second lanes.

3. The lane keeping system of claim 1, wherein the controller is configured to activate the alarm when at least one of the multiple distal points crosses an outer boundary of the at least one established lane into an area of the worksite not established as a lane.

4. The lane keeping system of claim 1, wherein the controller is configured to activate the alarm at a level that increases with a distance by which at least one of the multiple distal points has left the at least one established lane.

5. The lane keeping system of claim 4, further including a worksite controller, wherein:
    the controller is an onboard controller; and
    the onboard controller is configured to contact the worksite controller when the alarm has been activated at a highest level.

6. The lane keeping system of claim 1, wherein the controller is further configured to:
    make a comparison of a heading of the mobile machine with a travel direction designated for the at least one established lane; and
    selectively activate the alarm when the heading of the mobile machine contradicts the travel direction designated for the at least one established lane.

7. The lane keeping system of claim 1, wherein the controller is configured to activate the alarm when the multiple distal points straddle the at least one of the boundaries for at least a threshold period of time.

8. The lane keeping system of claim 7, wherein the controller is configured to immediately activate the alarm when more than two of the multiple distal points have crossed the at least one of the boundaries.

9. The lane keeping system of claim 1, wherein the multiple distal points includes points located at four corners of the mobile machine.

10. The lane keeping system of claim 1, wherein the controller is further configured to:
    make a determination that an overtaking event has been initiated; and
    selectively inhibit activation of the alarm based on the determination.

11. The lane keeping system of claim 1, wherein the controller is further configured to:
    detect movement of at least one of the multiple distal points across one of the boundaries of the at least one established lane;
    track a frequency of the movement across the one of the boundaries of the at least one established lane; and
    selectively activate the alarm based on the frequency.

12. The lane keeping system of claim 11, wherein the boundaries include transverse boundaries that border the at least one established lane along its length.

13. The lane keeping system of claim 12, wherein:
the at least one established lane includes sequential segments along its length; and
the controller is further configured to:
compare the location of the mobile machine with boundaries of the sequential segments; and
selectively activate the alarm when the location signal indicates that the mobile machine has crossed at least one of the boundaries into one of the sequential segments that is not authorized for use by the mobile machine.

14. A lane keeping system for use with a mobile machine, comprising:
a locating device positioned onboard the mobile machine and configured to generate a location signal indicative of a location of the mobile machine at a worksite;
an alarm positioned onboard the mobile machine; and
a controller in communication with the locating device and the alarm, the controller being configured to:
detect movement of the mobile machine across a boundary of an established lane at the worksite;
track a frequency of the movement across the boundary; and
selectively activate the alarm based on the frequency.

15. The lane keeping system of claim 14, wherein:
the controller is configured to activate the alarm at a level that increases with a distance by which the mobile machine has left the established lane;
the controller is an onboard controller;
the lane keeping system further includes a worksite controller; and
the onboard controller is configured to contact the worksite controller when the alarm has been activated at a highest level.

16. The lane keeping system of claim 14, wherein the controller is further configured to:
make a comparison of a heading of the mobile machine with a travel direction designated for the established lane; and
selectively activate the alarm when the heading of the mobile machine contradicts the travel direction designated for the established lane.

17. The lane keeping system of claim 14, wherein the controller is further configured to:
make a determination that an overtaking event has been initiated; and
selectively inhibit activation of the alarm based on the determination.

18. A lane keeping system for use with a mobile machine, comprising:
a locating device positioned onboard the mobile machine and configured to generate a location signal indicative of a location of the mobile machine at a worksite;
an alarm positioned onboard the mobile machine; and
a controller in communication with the locating device and the alarm, the controller being configured to:
compare the location of the mobile machine with boundaries of sequential lanes segments within an established lane at the worksite; and
selectively activate the alarm when the location signal indicates that the mobile machine has crossed at least one of the boundaries into one of the sequential lane segments that is not authorized for use by the mobile machine.

19. The lane keeping system of claim 18, wherein:
the controller is configured to activate the alarm at a level that increases with a distance by which the mobile machine has crossed the at least one of the boundaries;
the controller is an onboard controller;
the lane keeping system further includes a worksite controller; and
the onboard controller is configured to contact the worksite controller when the alarm has been activated at a highest level.

20. The lane keeping system of claim 18, wherein the controller is further configured to:
make a determination that an overtaking event has been initiated; and
selectively inhibit activation of the alarm based on the determination.

* * * * *

UNITED STATES PATENT AND TRADEMARK OFFICE
CERTIFICATE OF CORRECTION

| | | |
|---|---|---|
| PATENT NO. | : 9,000,954 B2 | Page 1 of 1 |
| APPLICATION NO. | : 13/855362 | |
| DATED | : April 7, 2015 | |
| INVENTOR(S) | : Borland et al. | |

It is certified that error appears in the above-identified patent and that said Letters Patent is hereby corrected as shown below:

In the Specification

Column 4, line 61, delete "Industrial Applicability" and insert -- INDUSTRIAL APPLICABILITY --.

Signed and Sealed this
Fifth Day of April, 2016

Michelle K. Lee
*Director of the United States Patent and Trademark Office*